(12) United States Patent
Bostic

(10) Patent No.: US 11,498,161 B1
(45) Date of Patent: Nov. 15, 2022

(54) PORTABLE PRESS AND METHOD OF USING SAME

(71) Applicant: Henry Bostic, Estill, SC (US)

(72) Inventor: Henry Bostic, Estill, SC (US)

( * ) Notice: Subject to any disclaimer, the term of this patent is extended or adjusted under 35 U.S.C. 154(b) by 925 days.

(21) Appl. No.: 16/292,936

(22) Filed: Mar. 5, 2019

Related U.S. Application Data

(60) Provisional application No. 62/732,611, filed on Sep. 18, 2018.

(51) Int. Cl.
| | |
|---|---|
| *B23P 15/00* | (2006.01) |
| *B23P 19/04* | (2006.01) |
| *B25B 11/00* | (2006.01) |
| *B25B 11/02* | (2006.01) |
| *F16C 43/02* | (2006.01) |
| *B23Q 3/00* | (2006.01) |
| *B23Q 3/154* | (2006.01) |
| *B23Q 3/15* | (2006.01) |
| *B23Q 3/06* | (2006.01) |
| *B25B 1/00* | (2006.01) |

(52) U.S. Cl.
CPC ............. *B23P 15/003* (2013.01); *B23P 19/04* (2013.01); *F16C 43/02* (2013.01); *B23Q 3/00* (2013.01); *B23Q 3/06* (2013.01); *B23Q 3/15* (2013.01); *B23Q 3/154* (2013.01); *B25B 1/00* (2013.01); *B25B 11/00* (2013.01); *B25B 11/02* (2013.01)

(58) Field of Classification Search
CPC ......... Y10T 29/53657; Y10T 29/53796; Y10T 29/5383; Y10T 29/5397; Y10T 29/53987; B66F 3/35; B66F 3/40; B25B 27/026; B25B 27/02; B25B 27/06; B25B 27/064; B25B 27/28
See application file for complete search history.

(56) References Cited

U.S. PATENT DOCUMENTS

| | | | |
|---|---|---|---|
| 2,520,162 | A | 8/1950 | Morrison |
| 2,807,081 | A * | 9/1957 | Black ...................... B25B 27/06 91/422 |
| 3,217,394 | A | 11/1965 | Castoe |
| 3,718,964 | A | 3/1973 | Warezak |
| 3,751,007 | A * | 8/1973 | Hollerith ................... B66F 3/35 254/2 R |
| 5,025,542 | A | 6/1991 | Jacks |
| 6,125,681 | A * | 10/2000 | Orcutt .................. B21D 39/048 72/402 |
| 8,627,557 | B2 | 1/2014 | Jansen |
| 9,120,215 | B2 | 9/2015 | Muenchrath |
| D770,252 | S | 11/2016 | Colter |
| 2017/0100825 | A1 | 4/2017 | Zeren |
| 2018/0193897 | A1* | 7/2018 | Dresang ................. B25B 27/10 |

* cited by examiner

*Primary Examiner* — Tyrone V Hall, Jr.
(74) *Attorney, Agent, or Firm* — B. Craig Killough

(57) ABSTRACT

A portable press is usable with parts that are assembled by interference fit or friction fit. A force application member slidably engages a plurality of guides. An actuator, such as a pneumatic or hydraulic jack or cylinder, applies force to the force application member to move the force application member toward a static plate. The force application member acts to either press in, or press out, a first part relative to a second part. The press of the invention is portable, so that the press can be moved to the mechanical structure requiring a press for removal or insertion of parts. The press may be constructed in a vertical or horizontal embodiment.

14 Claims, 11 Drawing Sheets

PORTABLE PRESS AND METHOD OF USING SAME

BACKGROUND OF THE INVENTION

It is common in mechanical assemblies to press fit certain parts into other parts. Examples are bearings and bushings that are press fit into housings. Kingpins used in vehicle steering mechanisms are another example.

It is frequently inconvenient and time consuming to disassemble a mechanical device to isolate a first part from another part into which the first part is press fit. Minimal disassembly of the mechanical construct to access the press fit part for removal or insertion is desirable.

There is a need for a press that is sufficiently portable to remove press fit parts from housings or other parts with minimal disassembly. The device should also be able to install press fit parts into a housing or other part as required.

SUMMARY OF THE INVENTION

The present invention is a portable press usable with parts that are assembled by interference fit or friction fit. The press may be used to press one part out of another part, as well as to press a part into another part. The press is portable, so that the press can be moved to the mechanical structure requiring a press for removal or insertion of parts. The device may be constructed in a vertical or horizontal embodiment.

The device is characterized by a force application member that slidably engages a plurality of guides. An actuator, such as a pneumatic or hydraulic jack or cylinder, applies force to the force application member to advance the force application member toward the static plate. The force application member acts to either press in, or press out, a first part relative to a second part.

BRIEF DRAWING DESCRIPTION

Figure 4:
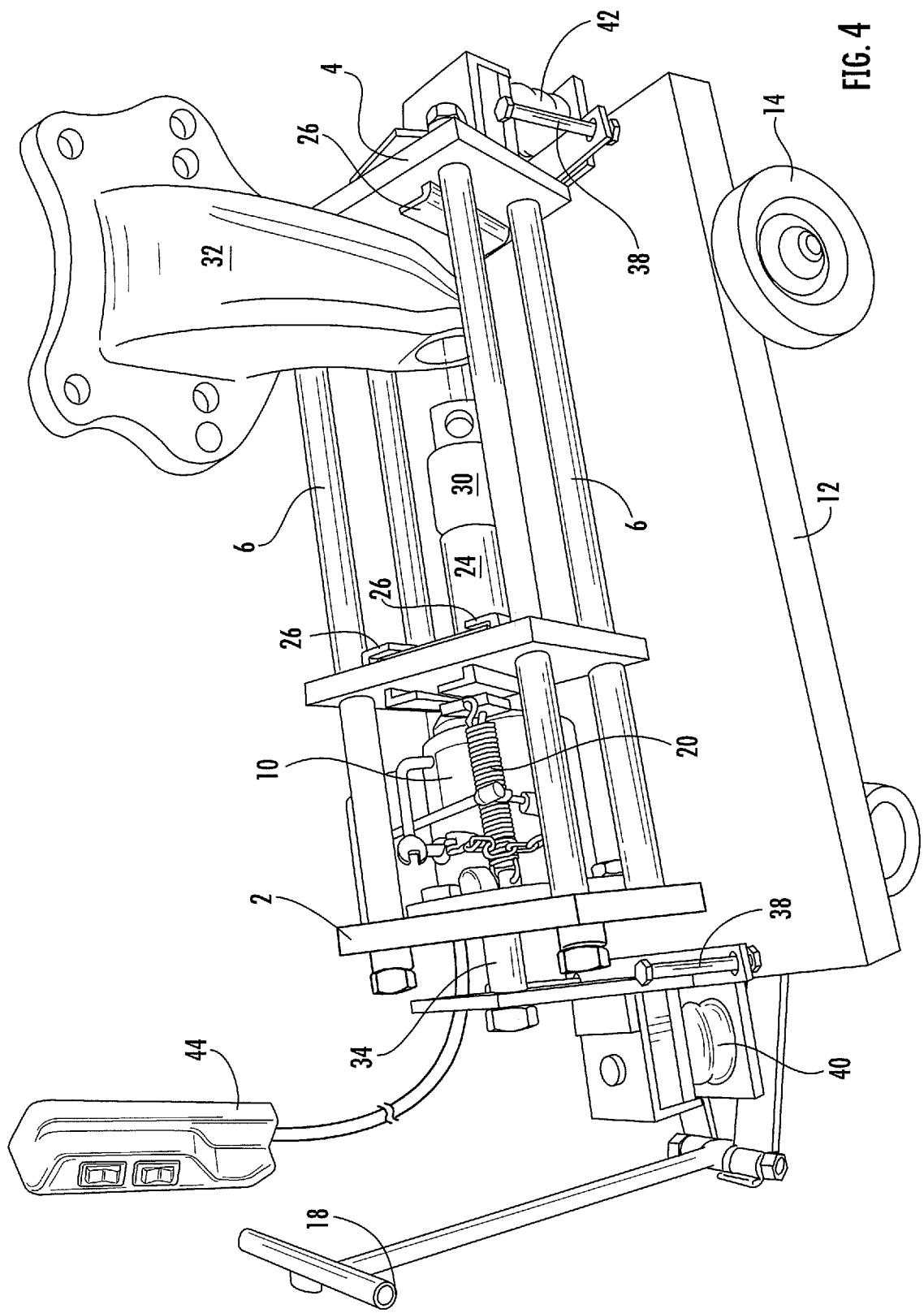

FIG. 4 demonstrates a pin in position in cylinder 24 for pressing into a housing 32.

Figure 5:
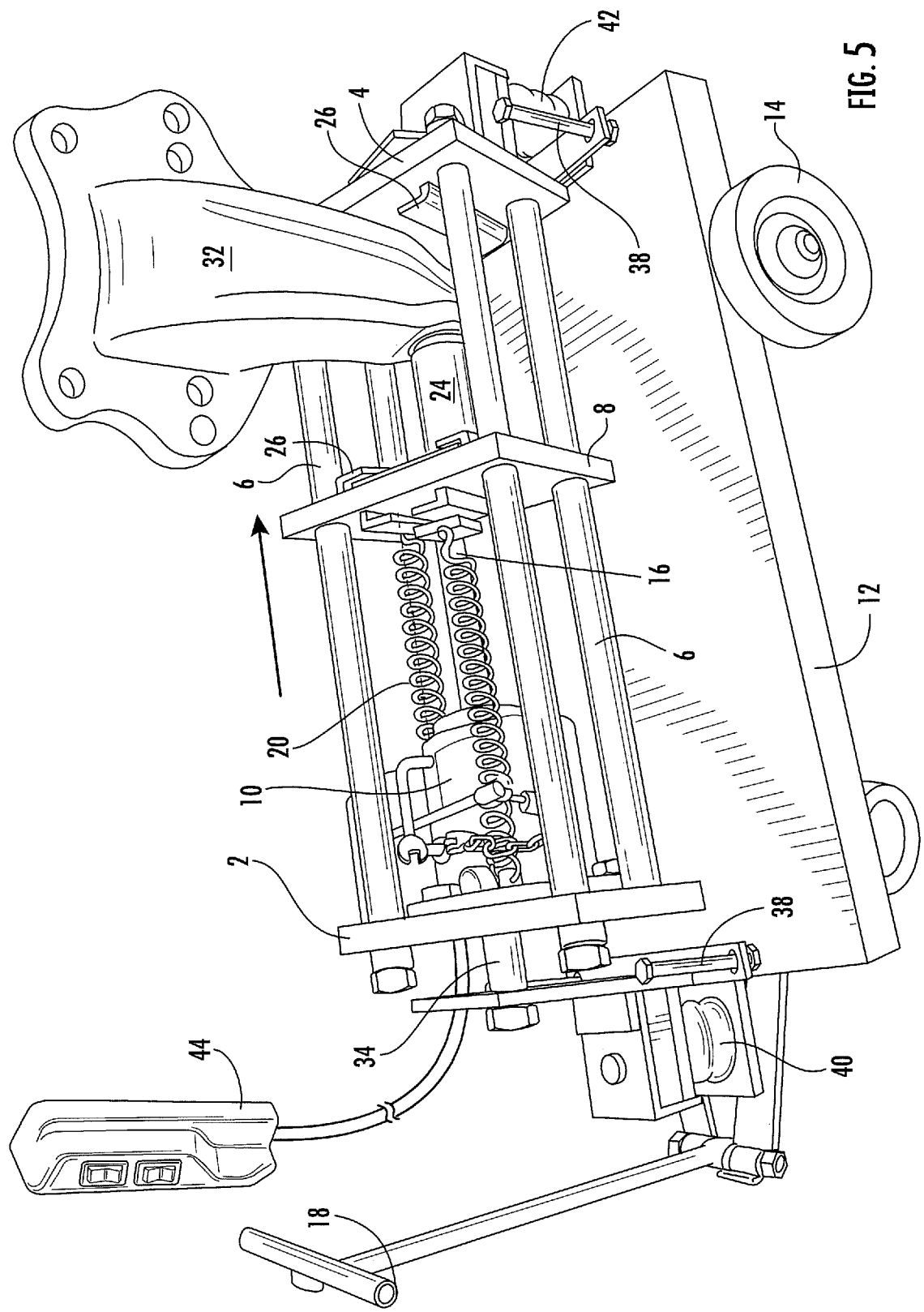

FIG. 5 is a sequence after the position of FIG. 4 showing cylinder 24 having pressed the pin into a housing 32.

Figure 6:
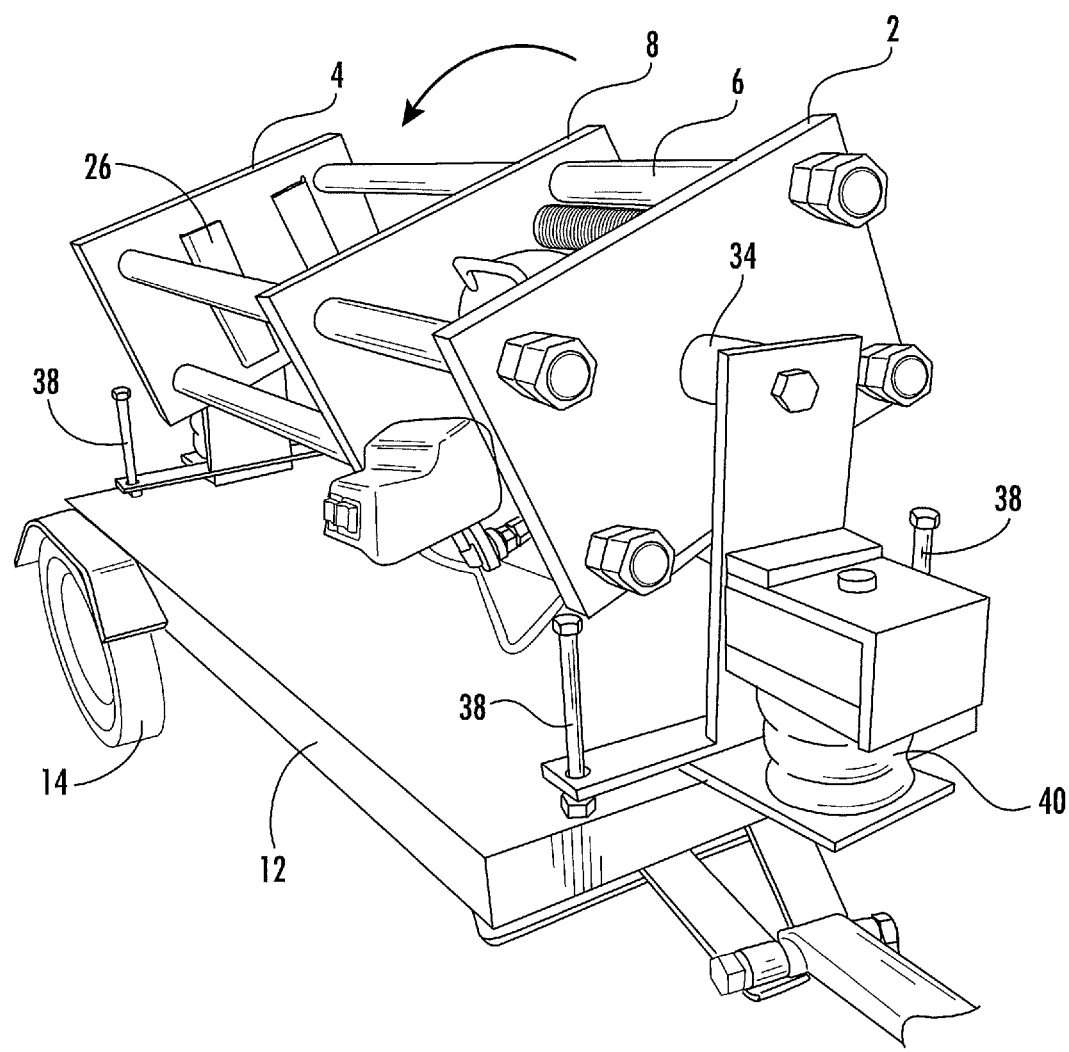

FIG. 6 is a perspective view of the press demonstrating that the press construct may be rotated for use.

Figure 7:
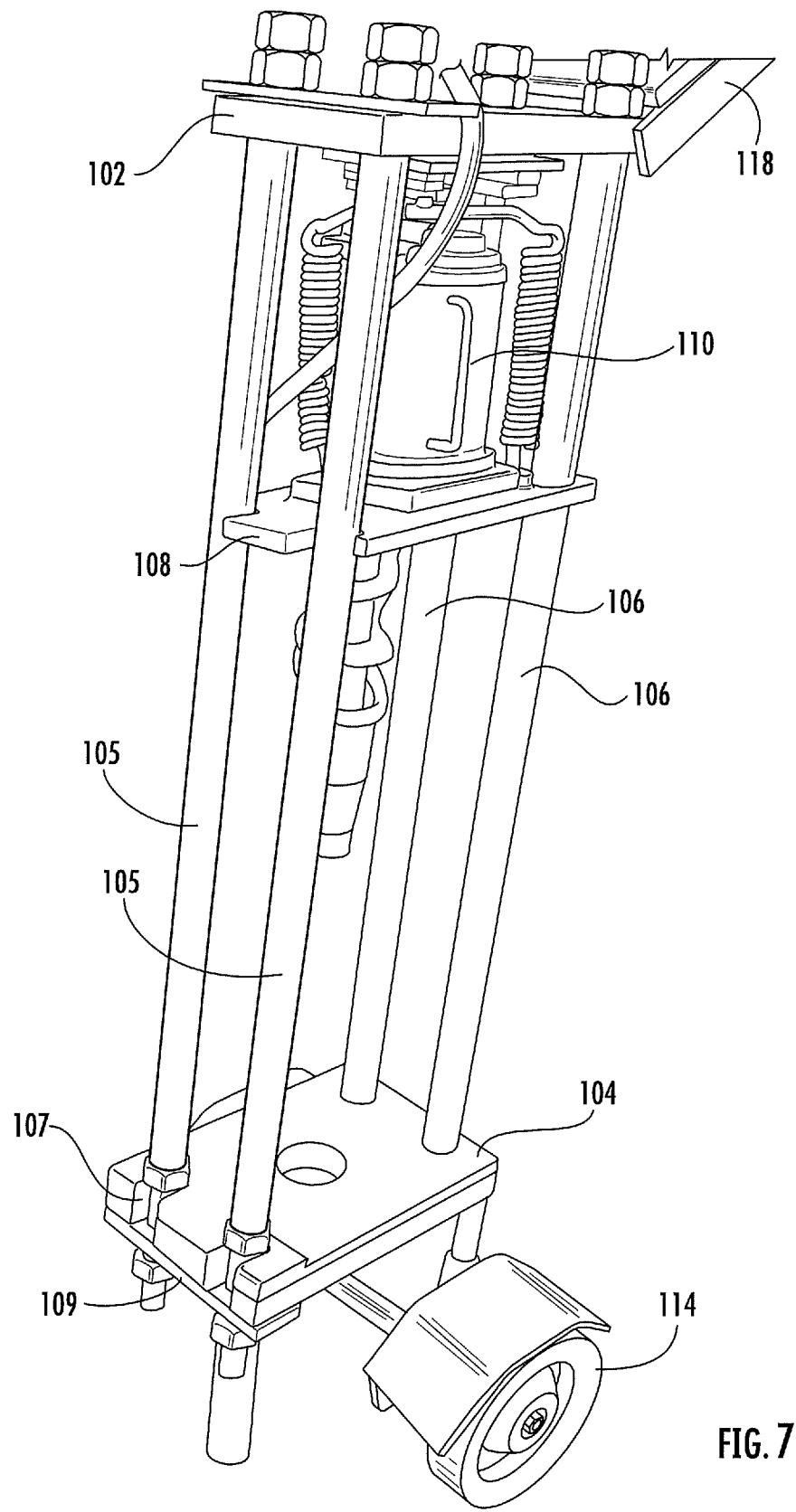

FIG. 7 is a perspective view of the press according to a vertical or upright embodiment of the invention.

Figure 8:
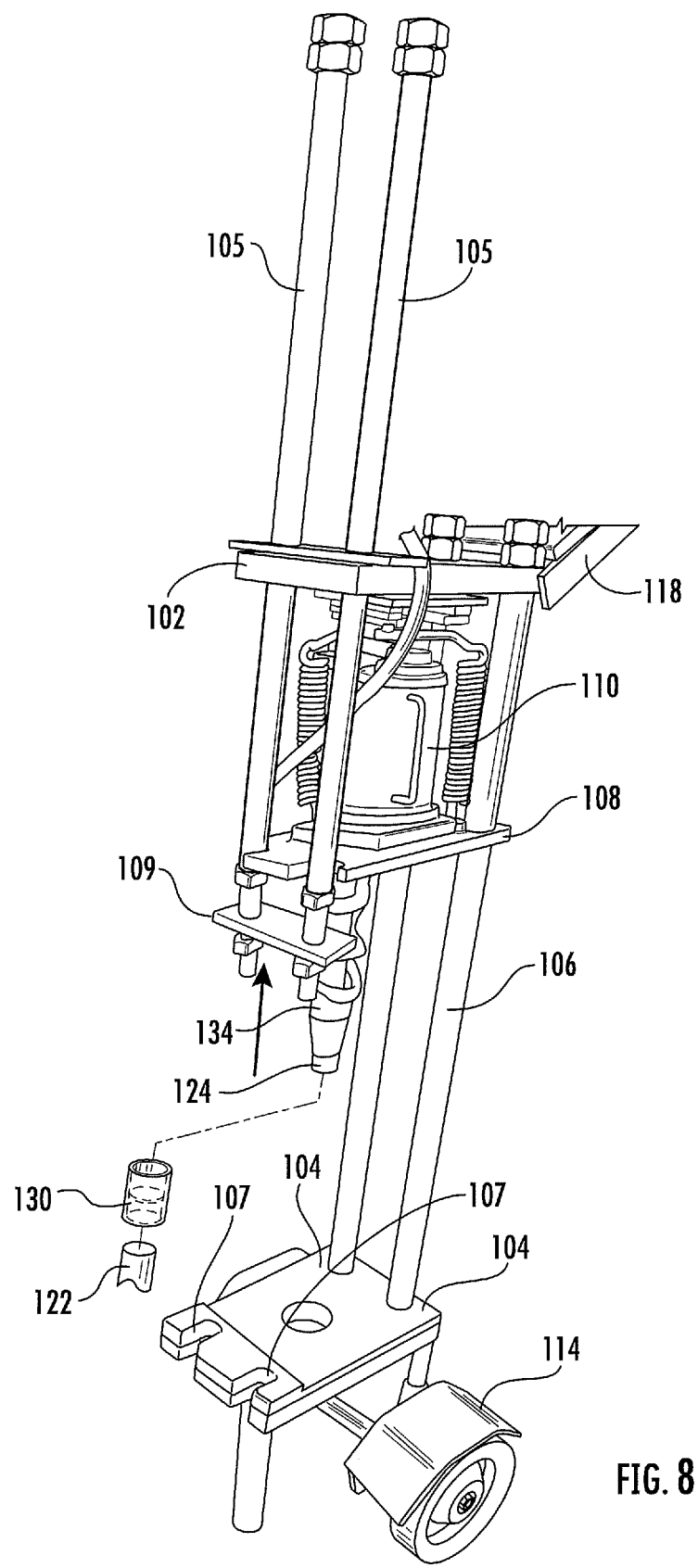

FIG. 8 is a perspective view of the press of FIG. 7 demonstrating opening of a side of the press for access to insert a work piece.

Figure 9:
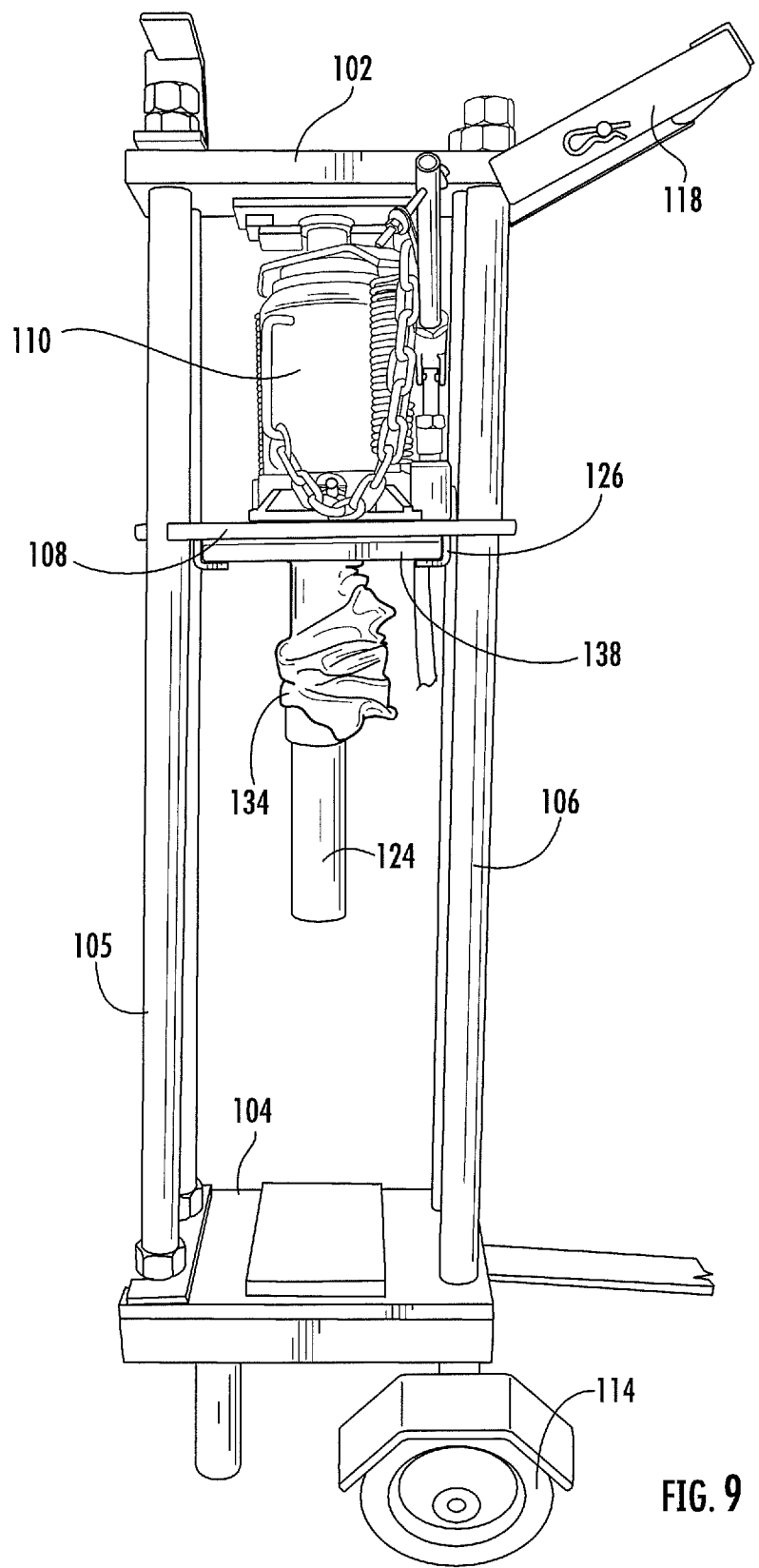

FIG. 9 shows a side of the press of FIG. 7.

Figure 10:
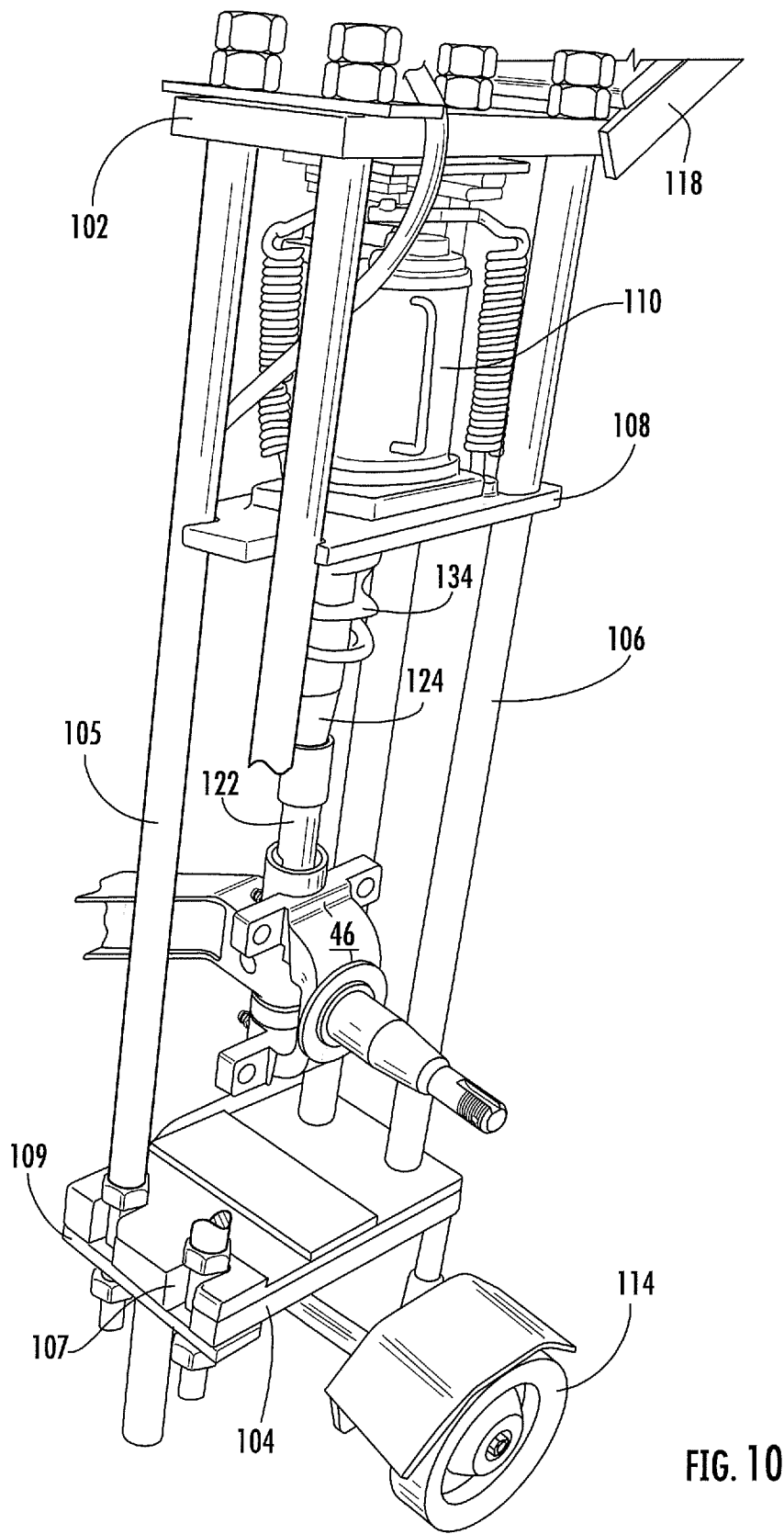
Figure 11:
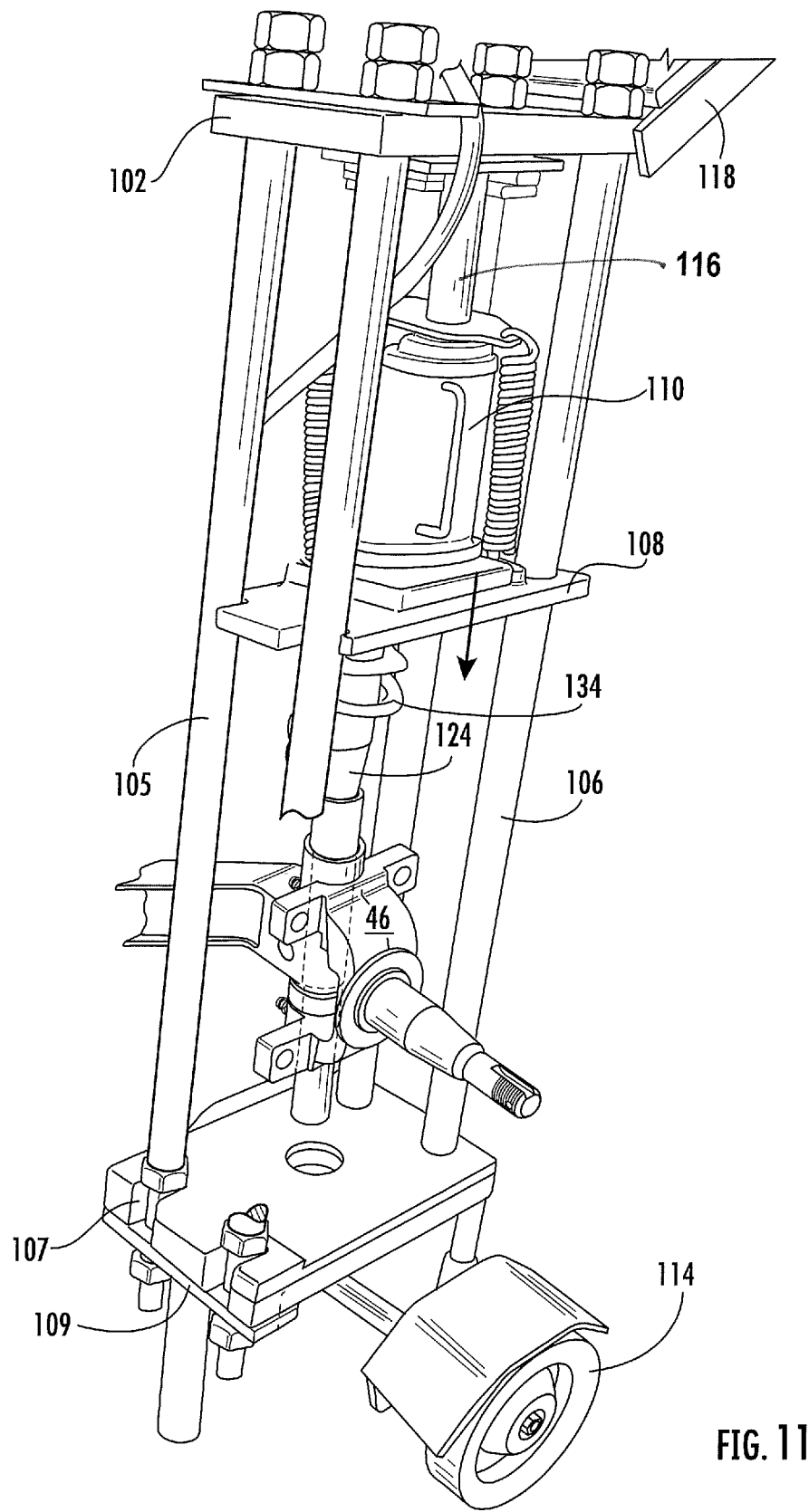

FIGS. 10 and 11 demonstrate the press of FIG. 7 pressing a king pin from a steering mechanism.

DESCRIPTION OF PREFERRED EMBODIMENTS

Figure 1:
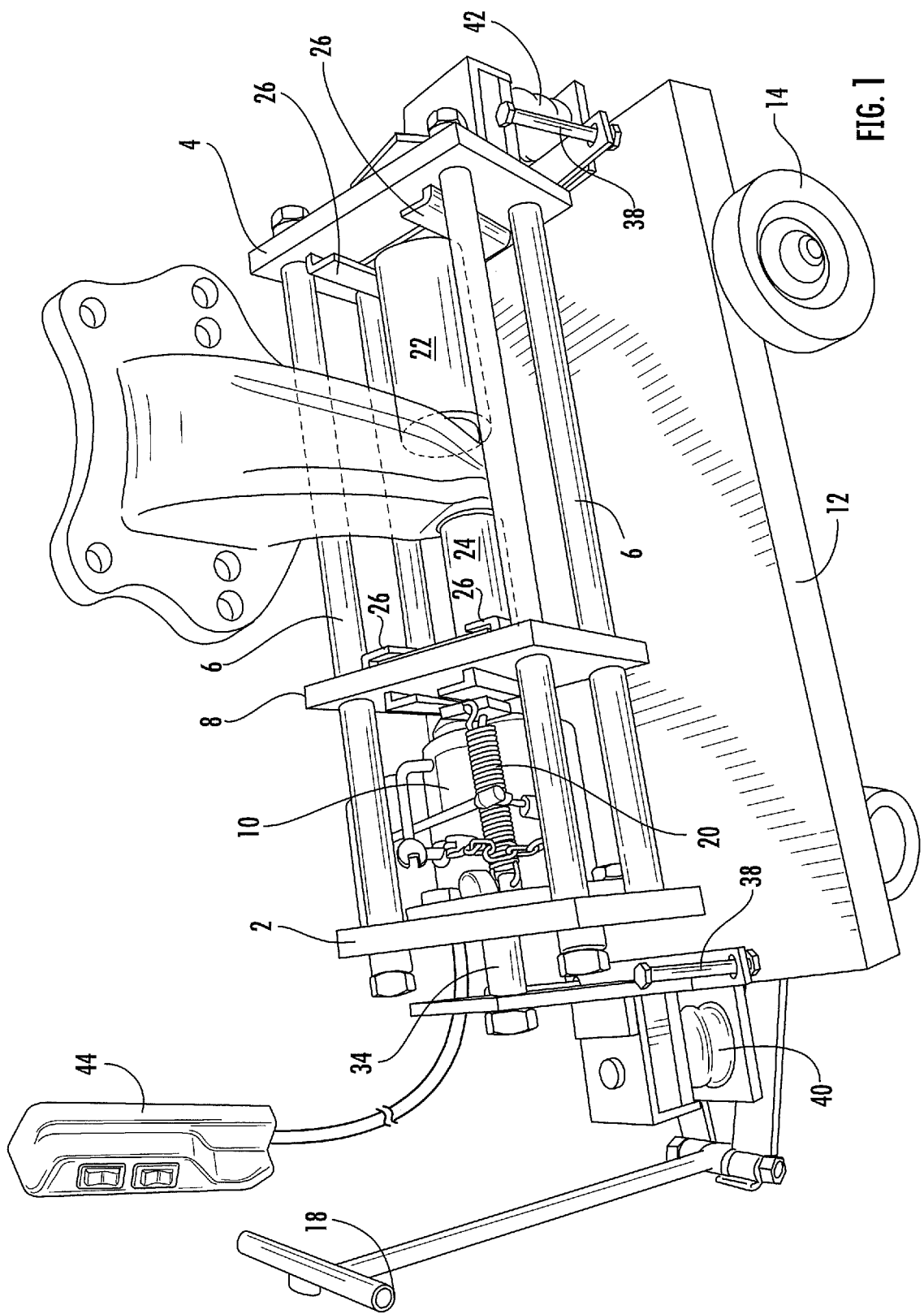
FIG. 1 is a perspective view of the press according to an embodiment of the invention and used in a horizontal position.

Turning to the drawing figures, FIG. 1 shows the press of the invention. In this embodiment, the press is mounted on a platform 12. The platform has a plurality of wheels or casters 14, so that it may be easily moved about on a floor or pavement. A pivoting handle 18 and wheel construct, similar to a wagon may be provided, so that one pair of wheels or casters pivots for steering the platform.

In the embodiment shown, the press is characterized by a first static base plate 2 and a second static base plate 4. The first static base plate and the second static base plate are mounted at opposite ends of a plurality of guides 6. The first static base plate and the second static base plate are static, and do not move relative to each other or to the guides. The first static base plate and the second static base plate may be mounted to the guides with the guides holding the first static base plate and the second static base plate in position.

Positioned between the first static base plate 2 and the second static base plate 4 is a force application member 8. The force application member moves along the guides and traverses the guides. The force application member moves along the guides from substantially the position shown in FIG. 1 to substantially the position shown in FIG. 2 upon application of force from the actuator 10. The force application member may be a plate having voids therein through which the guides are positioned, with the guides engaging the force application member in a manner that permits slidable engagement of the force application member along the guides. In use, the force application member is repositioned by the actuator along the guides as demonstrated in the drawing figures.

In a preferred embodiment, there are four (4) guides 6. The guides are substantially parallel to each other so as to allow movement of the force application member without the force application member binding on the guides. As shown, each of the four guides engage static base plates 2,4 and the force application member 8 near the four corners of each of the static base plates and the force application member. It may be possible in some applications to use as few as three (3) guides.

Actuator 10 is positioned between the first static base plate 2 and the force application member 8. In this embodiment, the actuator is mounted to the first static base plate. The actuator is constructed and arranged to apply force to the force application member to move the force application member along the guides, and typically from the position demonstrated in FIG. 1 to the position demonstrated in FIG. 2. The length of travel of the force application is depended on the actuator. An actuator using a displaced piston will cause the force application member to move about the length of the throw of the piston 16 in one embodiment.

The actuator 10 may be a pneumatic or hydraulic cylinder supplying sufficient force to move the force application member as required to accomplish the required function of the press in pressing a part into, or out of, another part.

Figure 2:
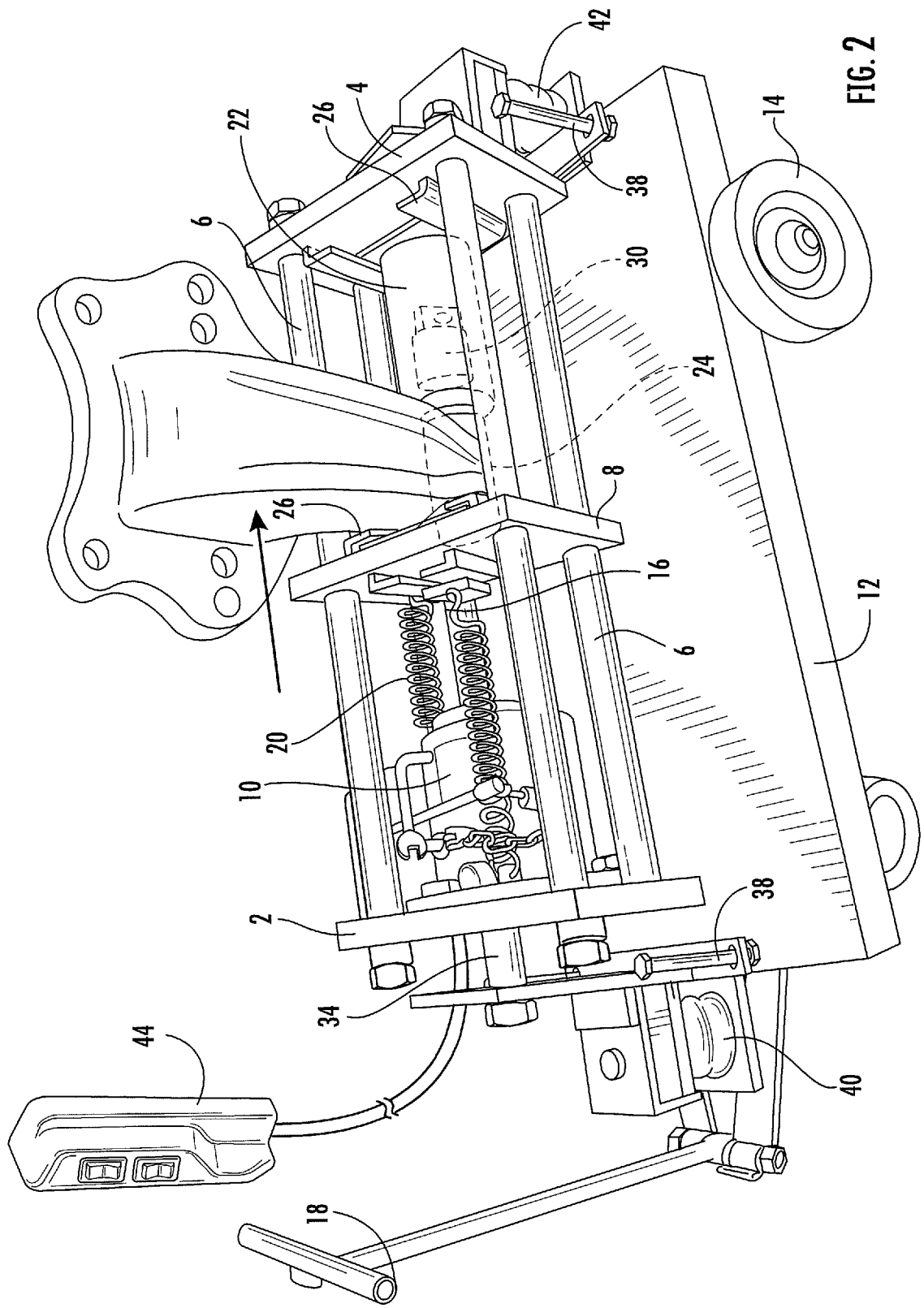
FIG. 2 shows the press of FIG. 1, demonstrating movement of the force application member along the plurality of guides, with force applied to the force application member by the actuator.

In one embodiment as shown in the drawing figures, the actuator is a pneumatic jack 10 having a piston 16 extending therefrom when air pressure is applied to the jack. FIG. 2 demonstrates air pressure applied to the pneumatic jack, causing the piston 16 to extend from the jack and push the force application member toward the second static base plate.

When air pressure is released from the pneumatic jack 10, the force application member 8 is retracted toward the first static base plate 2. This retraction may be accomplished in one embodiment by spring biasing as shown. Springs 20 may be used that have sufficient tension to retract the force application member and piston may be used. The springs may be attached at one end to retract the force application member, and may be attached statically at the opposite ends, such as to the first static base plate or to the actuator housing.

Figure 3:
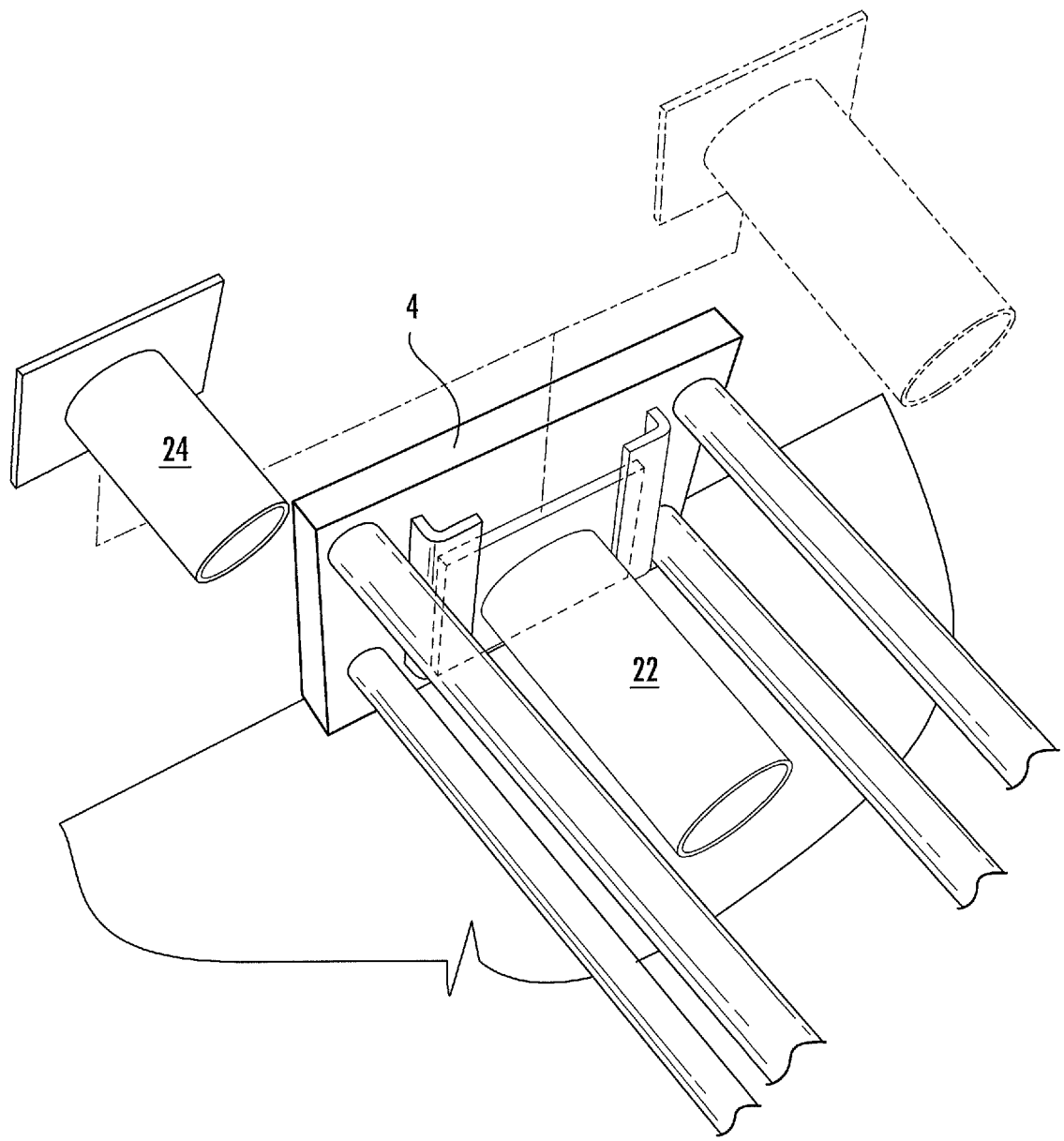
FIG. 3 is an isolation of the force application member and the guides demonstrating the interchangeability of the larger diameter cylinder and the small diameter cylinder.

In the application of the device demonstrated in FIG. 1, mounted in the force application member 8 and the second static base plate 4 are a larger diameter cylinder 22 and a smaller diameter cylinder 24. The relative positioning of the larger diameter cylinder and the smaller diameter cylinder is dependent upon whether a part is pressed into or pressed out of, another structure. Accordingly, the device is constructed so that the position of the larger diameter cylinder and the position of the smaller diameter cylinder can be swapped. FIG. 3. In most embodiments elements 24 and 26 will be cylindrical, but other geometric configurations may be employed if the application so requires.

The second static base plate 4 and the force application member 8 each have pairs of opposing guides 26 which may be members formed at ninety degrees and allow a generally rectangular base of the cylinder to slide into and out of the members. A stop is provided. When the bases of the cylinders are positioned within the guides 26 to the full stop position, the larger diameter cylinder 22 and the smaller cylinder 24 are concentric when each is mounted in one of the force application member 8 and the static base plate 4. The base plate for each of the larger diameter cylinder and the smaller cylinder are constructed to achieve the concentric alignment of the cylinders. With the cylinders shown in the position of FIG. 2, the larger cylinder will fully accept the smaller cylinder therein by virtue of the inside diameter of the large cylinder and the concentric nature of the larger cylinder relative to the smaller cylinder.

In a preferred embodiment, the first static base plate 2 and the second static base plate 4 have axles 34 extending there from. The axles extend through a bearing surface that allows the press construct to rotate relative to platform 12. FIG. 6. Rotation of the press construct allows the space between the guides into which a work piece is inserted to be oriented as required for receiving the work piece.

In the embodiment shown in the drawings, air bags are used as a height adjustment device to elevate the press construct so that the press is at a work height as needed to perform a task. Inflatable air bags 40, 42 may be mounted at each end of the press construct. Inflation of the air bags lifts the press construct, and deflation of the air bags lowers the press construct. The press construct can move upwardly relative to retaining pins 38 mounted to the platform 12. The retaining pins guide the press construct and retain the press construct.

A controller 44 may be provided that causes compressed air to enter the air bags or to be released from the air bags 40,42 for elevating or lowering the press construct. The controller may also be used to actuate the actuator 10, by causing compressed air or hydraulic fluid to actuate the actuator such as by providing air pressure or hydraulic pressure to force a piston from the actuator. The controller may comprise switches that initiate inflation and deflation of the air bags and actuation (or termination of actuations) of the actuator.

An example of use of the device is for removing a bushing that is attached to a leaf spring of the type typically used in rear suspensions of trucks. The leaf spring can be removed, so as to expose an arm 32 in which a bushing 30 is mounted. The arm is part of a vehicle and may remain mounted to the vehicle. The arm is placed between the larger cylinder 22 and the smaller cylinder 24 in the space shown between the larger cylinder and the smaller cylinder in FIG. 1. The actuator 10 is actuated, such as by applying sufficient air pressure to the actuator, so that the actuator moves the force application member 8 from the position shown in FIG. 1 to the position shown in FIG. 2. The force applied by the smaller cylinder to the bushing as the force application member 8 moves toward the static base plate 4 will force the bushing from the housing. The bushing is received within the larger cylinder where it may easily be retrieved after the force actuation member retracts. Other applications for the device will be recognized by those skilled in mechanical trades.

To install a part such as a bushing, the bushing may be positioned in the smaller cylinder 24 mounted in the force application member 8. The larger cylinder 22 is not used as shown in FIG. 4, since the second static base plate 4 provides resistive force to arm 32 The larger cylinder or other constructs mounted in guide 26 of base plate 4 may be used to provide resistive force in some applications. The bushing or other work piece can be partially inserted in cylinder 24 or, or in some applications partially positioned in the arm or other work piece, or manually held in position as the force application member advances toward the second static base plate 4. The smaller cylinder then pushes the bushing into the arm, with the larger cylinder and/or the second static base plate applying resistive force to the arm.

In other applications, removal of one part from another part of a mechanical construct will involve an embodiment of the device being used in a vertical or upright rather than a horizontal position. An example of such a requirement is removal or installation of a kingpin that is used in a steering mechanism of vehicles, in particular large trucks. The vertical embodiment of the invention allows a kingpin of a large truck to be pressed in or pressed out of the housing in situ with the spindle mounted to the axle. FIGS. 7 through 11 shows an embodiment of the device that may be used in a vertical position to remove or install parts in work pieces.

FIG. 7 shows the press of the invention in a vertical embodiment. The press has a plurality of wheels or casters 114 mounted to the press construct so that the press may be easily moved about on a floor or pavement. A handle 118 may be provided for assisting in movement of the press.

In the embodiment shown, the vertical press is characterized by a first static base plate 102 and a second static base plate 104. The first static base plate and the second static base plate are mounted at opposite ends of a plurality of guides 105, 106. The first static base plate and the second static base plate are static, and do not move relative to each other or to the guides. The first static base plate and the second static base plate may be mounted to the guides with the guides holding the first static base plate and the second static base plate in position. The guides are positioned in a generally vertical orientation in this embodiment.

Guides 105 may be moved out of cutouts 107 and then moved upwardly as shown in FIG. 8. This positioning allows a work piece to be positioned in an interior of the guides of the vertical press construct. Guides 105 may be threaded so that lock nuts may be loosened to allow the guides 105 to be pivoted slightly and away from the cutouts 107 in the second static base plate 104. Guides 105 slide upwardly relative to first static base plate 102 to allow a work piece to be inserted within the vertical press construct. FIG. 10 shows an exemplary work piece, which is a steering mechanism 46 for a vehicle, within a space defined by the guides 105,106. A plate 109 may be used to retain the guides 105 in position relative to each other. The press is usable with a work piece such as a steering mechanism with the steering mechanism mounted on the vehicle, avoiding the need to remove the steering mechanism to press a part in or out.

Positioned between the first static base plate 102 and the second static base plate 104 is a force application member 108. The force application member moves along the guides 105,106 and traverses the guides. The force application member moves along the guides in the same manner as the horizontal press demonstrated in FIG. 1 and FIG. 2, but in a generally vertical direction rather than a generally horizontal direction. The force application member may be a plate having voids (for guides 106) or cut outs (for guides 105) therein through which the guides are positioned, with the guides engaging the force application member in a manner that permits slidable engagement of the force application member along the guides, so that the force application member is moved along the guides to apply pressure to a work piece.

In a preferred embodiment, there are four guides 105, 106. The guides are substantially parallel to each other so as to allow movement of the force application member without the force application member binding on the guides. As shown, each of the four guides engage the static base plates 102,104 and the force application member 108 near the four corners of each of the static base plates and the force application member. It may be possible to use as few as three (3) guides in some applications.

Actuator 110 is positioned between the first static base plate 102 and the force application member 108. The force application member is mounted to actuator. A piston 116 of a jack used as the actuator pushes against the first static base plate. The piston may be positioned between a housing of the actuator and the first static base plate. The actuator is moved downwardly as it pushes against the first static base plate and moves the attached force application member along the guides 105,106. The actuator 110 may be a pneumatic or hydraulic cylinder supplying sufficient force to move the force application member as required to accomplish the required function of the press in pressing a part into, or out of, another part.

In one embodiment, the actuator is a pneumatic jack having a piston 116 extending therefrom when air pressure is applied to the jack. When air pressure is released from a pneumatic jack the force application member 108 retracts toward the first static base plate 102. In another embodiment the jack may be a hydraulic jack such as a bottle jack that uses hydraulic pressure to force a piston from the housing. Retraction may be assisted in one embodiment by spring biasing.

A shank 124 is attached to the force application member 108. The shank may be attached, such as by welding, to a plate 138 that may be slidably inserted between guides 126. In this manner, shanks of different lengths and diameters may be used according to the required application. The shank may be a steel rod or steel tube, but other materials suitable for pressing a part in or out of a housing (such as a king pin of a steering mechanism) may be used. The shank may be surrounded at an upper portion by a flexible boot 134, that may be formed of plastic or rubber. The flexible boot protects the shank by in some applications and may also protect the work piece, such as a vehicle to which a steering mechanism is mounted.

In another embodiment, the shank 124 is coupled by a coupling 130 to a probe 122. This embodiment allows the probe to be formed of different materials from the shank, such as softer materials that will not damage the work piece. This embodiment also allows the overall length of the construct to be varied and/or allows the probe to have a different diameter or geometry from the shank.

FIG. 11 shows a kingpin 132 pressed out of the steering mechanism as the actuator 110 pushes force application member 108 downwardly. The press may be used to press a kingpin into the steering housing as well. A shank of appropriate length is mounted in the guides 126. The kingpin in positioned over the receiving void in the steering mechanism and the device is actuated to advance the shank and push the kingpin into the steering mechanism. A person of skill in the mechanical trades such as technicians will recognize other applications for the device.

What is claimed:

1. A press for bushings and bearings, comprising:
a first static base plate;
a second static base plate that is spaced apart from the first static base plate;
a plurality of guides positioned between first static base plate and the second static base plate, wherein the plurality of guides are spaced apart from each other and are generally parallel to each other;
a force application member, wherein the force application member is positioned between the first static base plate and the second static base plate and the force application member slidably engages the plurality of guides;
a first cylinder extending from a side of the force application member that is opposite the first static base plate;
an actuator, wherein the actuator is positioned between the force application member and the first static base plate;
wherein the actuator applies a force to the force application member to move the force application member and the first cylinder toward the second static base plate.

2. A press for bushings and bearings as described in claim 1, further comprising:
a second cylinder removably positioned on the second static base plate;
wherein the second cylinder is constructed and arranged to receive and hold a work piece in the interior of the second cylinder.

3. A press for bushings and bearings as described in claim 2, wherein the first cylinder and the second cylinder are constructed and arranged to slidably engage the force application member and the second static base plate.

4. A press for bushings and bearings as described in claim 2, wherein the first cylinder is generally concentric with the second cylinder.

5. A press for bushings and bearings as described in claim 2, wherein the first cylinder and the second cylinder are constructed and arranged to slidably engage the force application member and the second static base plate and wherein the first cylinder is generally concentric with the second cylinder.

6. A press for bushings and bearings as described in claim 2, wherein a construct as described in claim 1 is mounted on a platform, and wherein the platform comprises a plurality of wheels.

7. A press for bushings and bearings as described in claim 1, wherein the press for bushings and bearings as described in claim 1 is mounted on a platform, and wherein the platform comprises a plurality of wheels, and wherein the platform is constructed and arranged to be alternately positioned with the guides in a generally horizontal orientation and in a generally vertical orientation.

8. A press for bushings and bearings as described in claim 1, wherein the press for bushings and bearings as described in claim 1 is mounted on a platform, wherein the platform comprises a plurality of wheels, and wherein a construct comprising the first static base plate, the second static base plate, the plurality of guides, and the force application member is rotatably mounted to the platform when the construct is positioned generally horizontally.

9. A press for bushings and bearings as described in claim 1, and wherein the press for bushings and bearings comprising the first static base plate, the second static base plate, the plurality of guides, and the force application member is mounted to a height adjustment device.

10. A press for bushings and bearings as described in claim 9, wherein the height adjustment device is an inflatable air bag.

11. A press for bushings and bearings as described in claim 1, wherein the press for bushings and bearings a construct as described in claim 1 is mounted on a platform, and wherein a construct comprising the first static base plate, the second static base plate, the plurality of guides, and the force application member is rotatably mounted to the platform and the construct is mounted to a height adjustment device.

12. A press for bushings and bearings as described in claim 1, wherein a guide of the plurality of guides slidably engages the first static base plate.

13. A press for bushings and bearings as described in claim 1, comprising a shank mounted to the force application member is positioned opposite the actuator.

14. A press for bushings and bearings as described in claim 1, wherein a piston of the actuator is positioned between a housing of the actuator and the first static base plate.

* * * * *